Aug. 28, 1951  L. L. HYLER ET AL  2,565,850
APRON AND EJECTOR CONTROL FOR EARTH MOVING APPARATUS
Filed Jan. 31, 1946  8 Sheets-Sheet 2

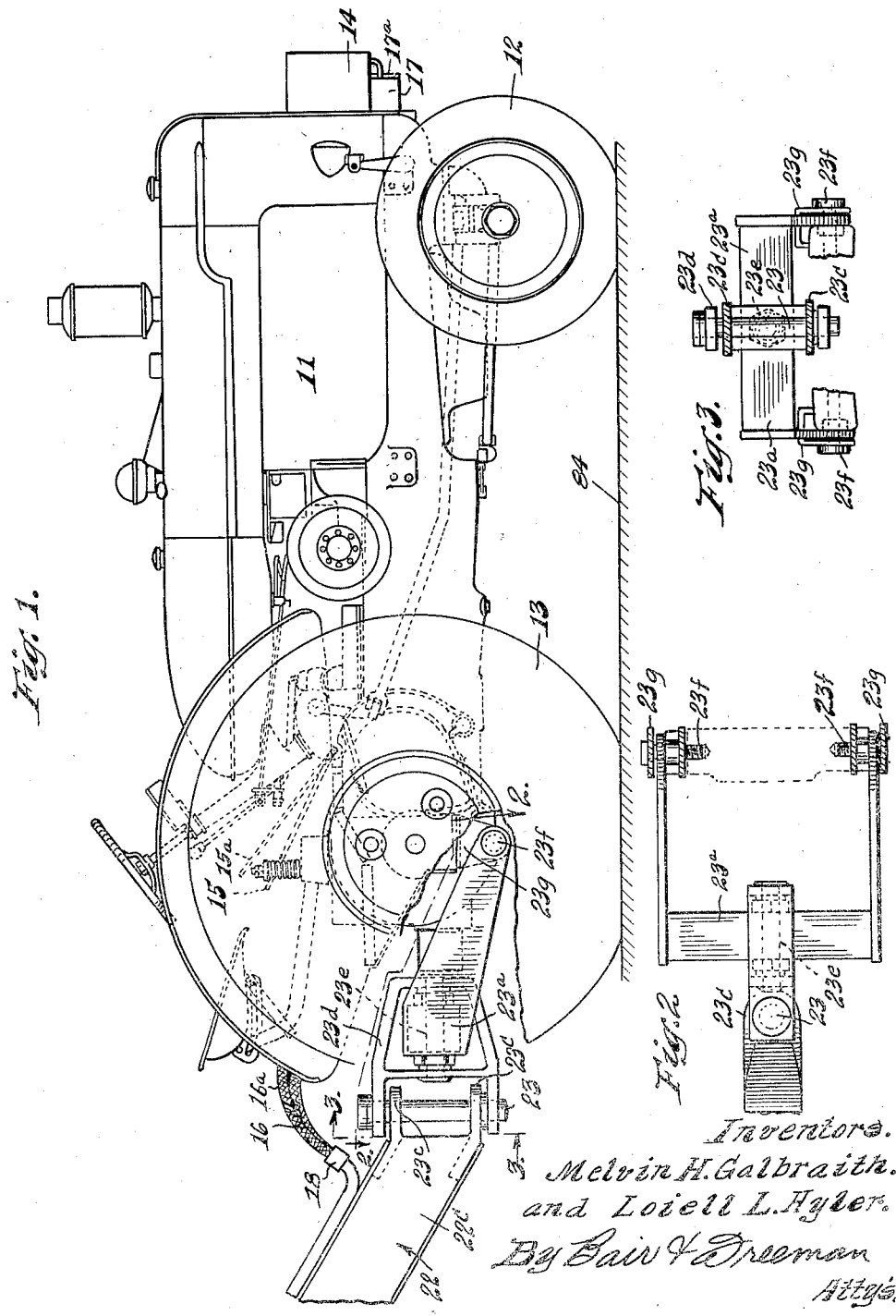

Inventors.
Melvin H. Galbraith.
and Loiell L. Hyler.
By Bair & Freeman
Atty's

Aug. 28, 1951     L. L. HYLER ET AL     2,565,850
APRON AND EJECTOR CONTROL FOR EARTH MOVING APPARATUS
Filed Jan. 31, 1946     8 Sheets-Sheet 3
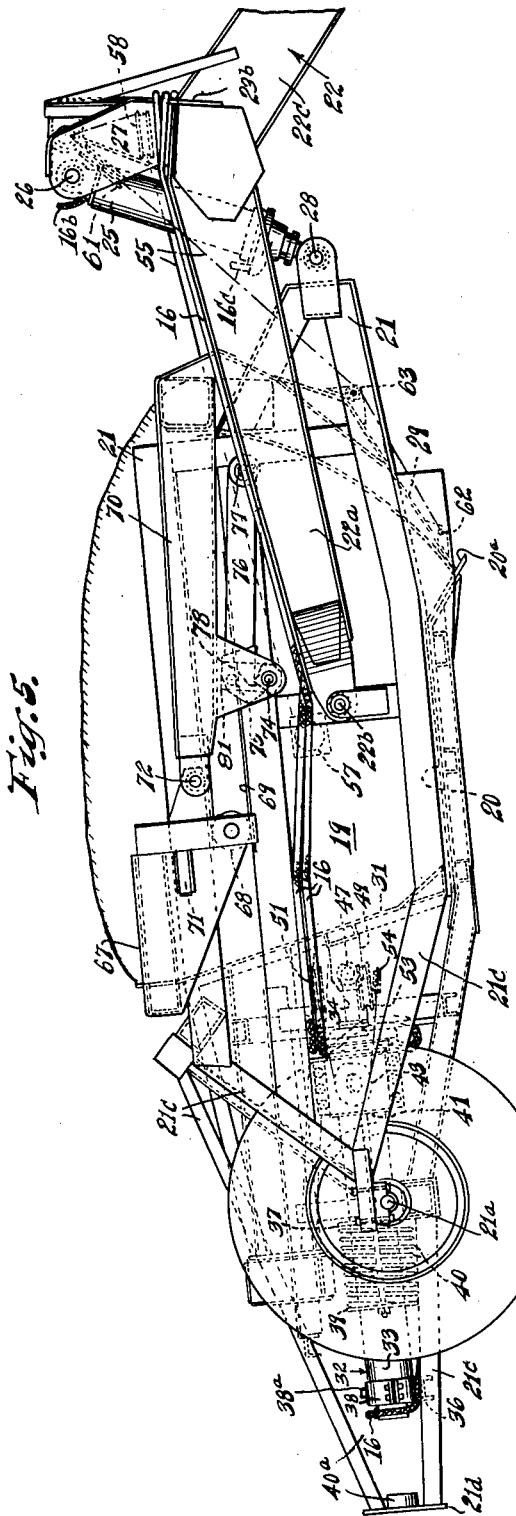
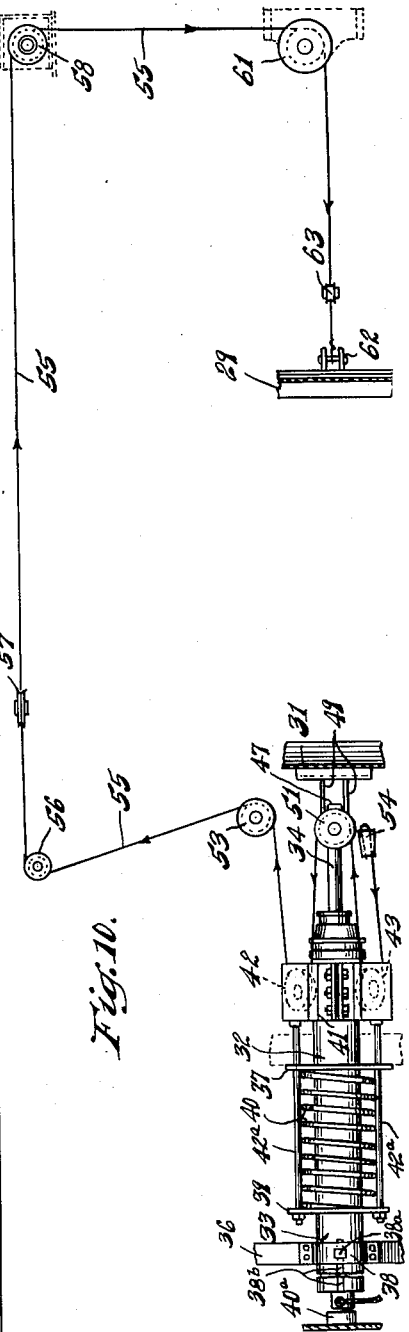
Inventors.
Melvin H. Galbraith
and Loiell L. Hyler
By Bair & Freeman
Attys.

Aug. 28, 1951     L. L. HYLER ET AL     2,565,850
APRON AND EJECTOR CONTROL FOR EARTH MOVING APPARATUS
Filed Jan. 31, 1946     8 Sheets-Sheet 4
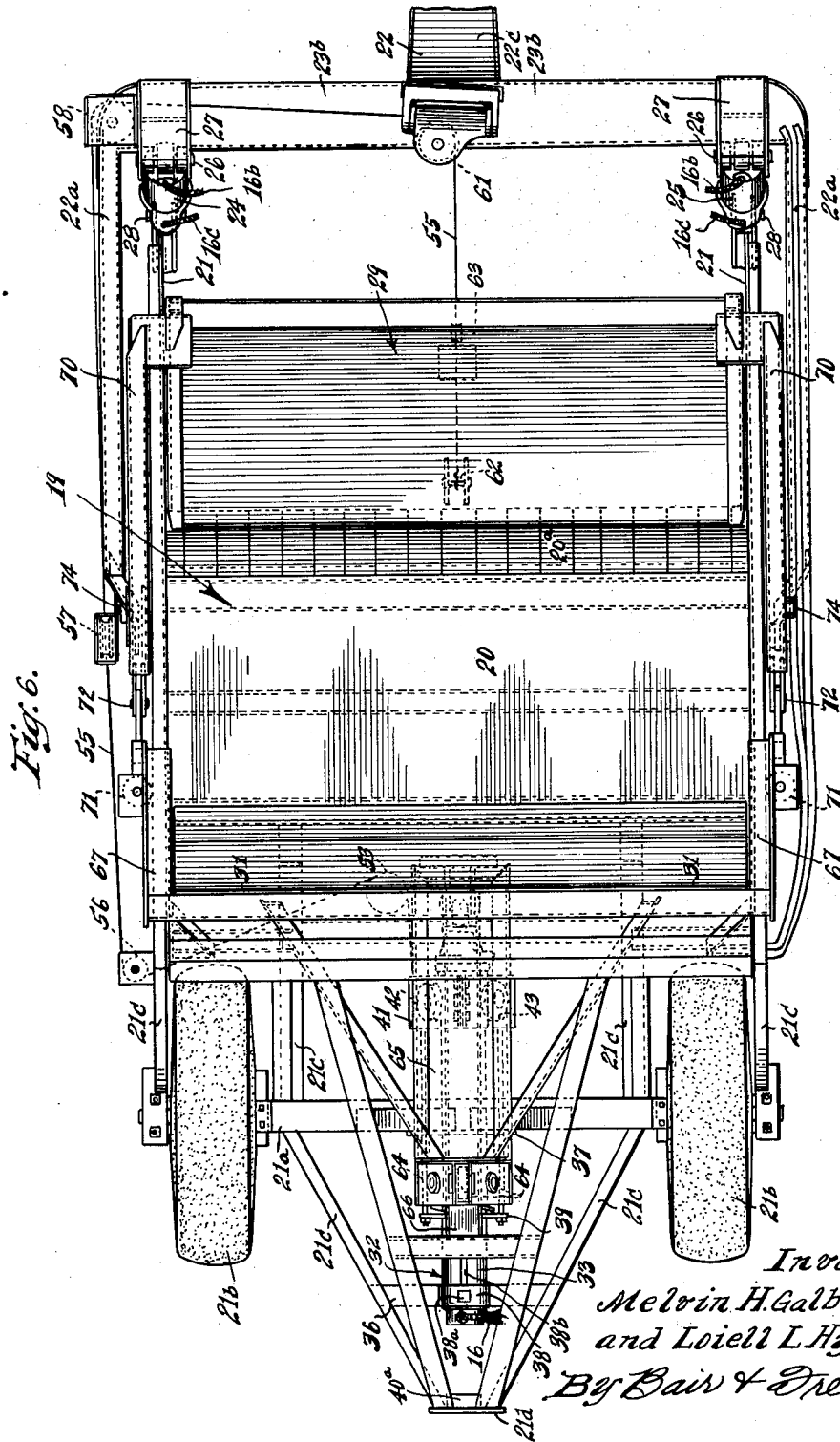
Inventors.
Melvin H. Galbraith.
and Loiell L. Hyler.
By Bair & Freeman
Attys.

Aug. 28, 1951     L. L. HYLER ET AL     2,565,850
APRON AND EJECTOR CONTROL FOR EARTH MOVING APPARATUS
Filed Jan. 31, 1946     8 Sheets-Sheet 5
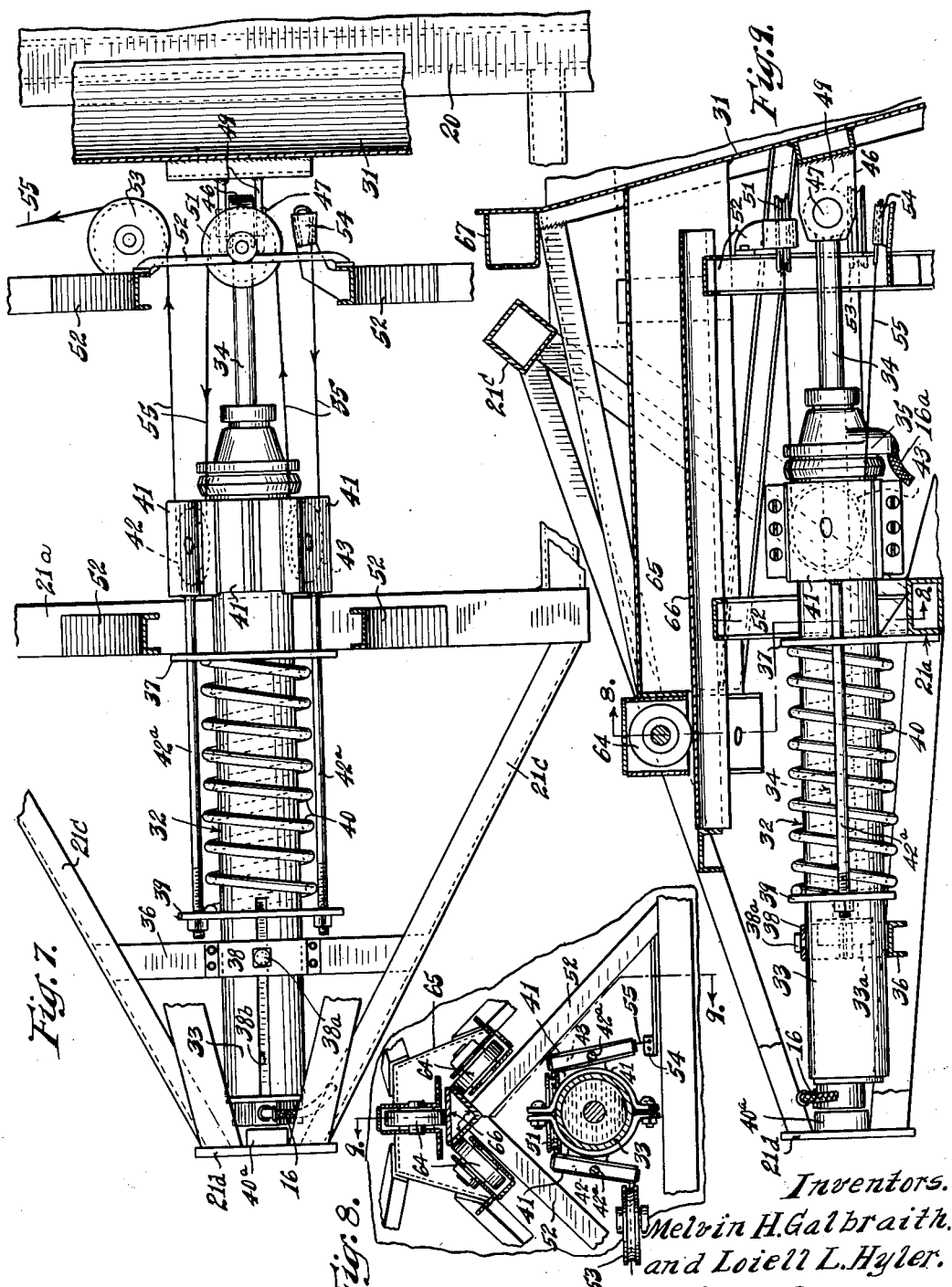
Inventors.
Melvin H. Galbraith.
and Loiell L. Hyler.
By Bair & Freeman
Attys.

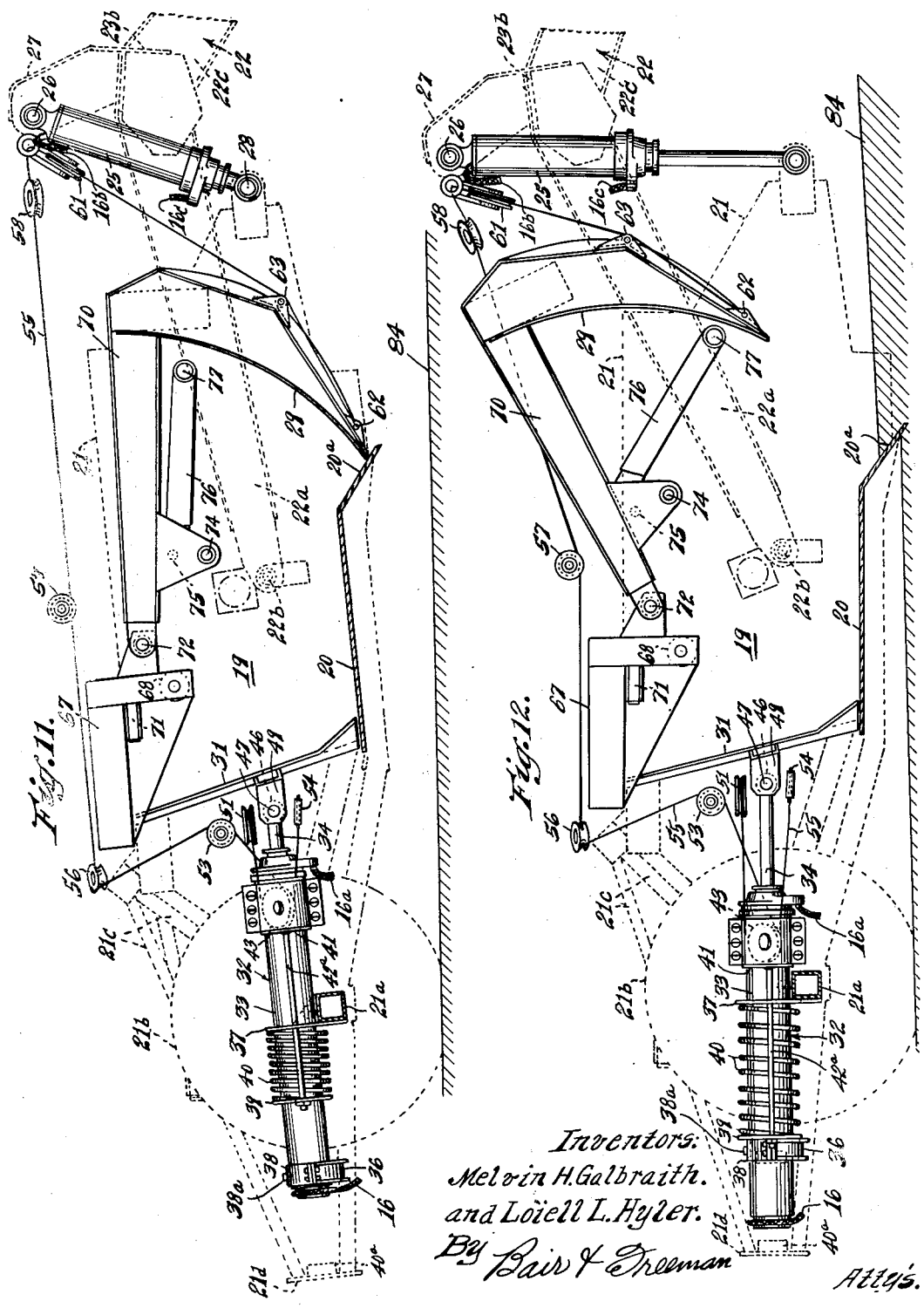

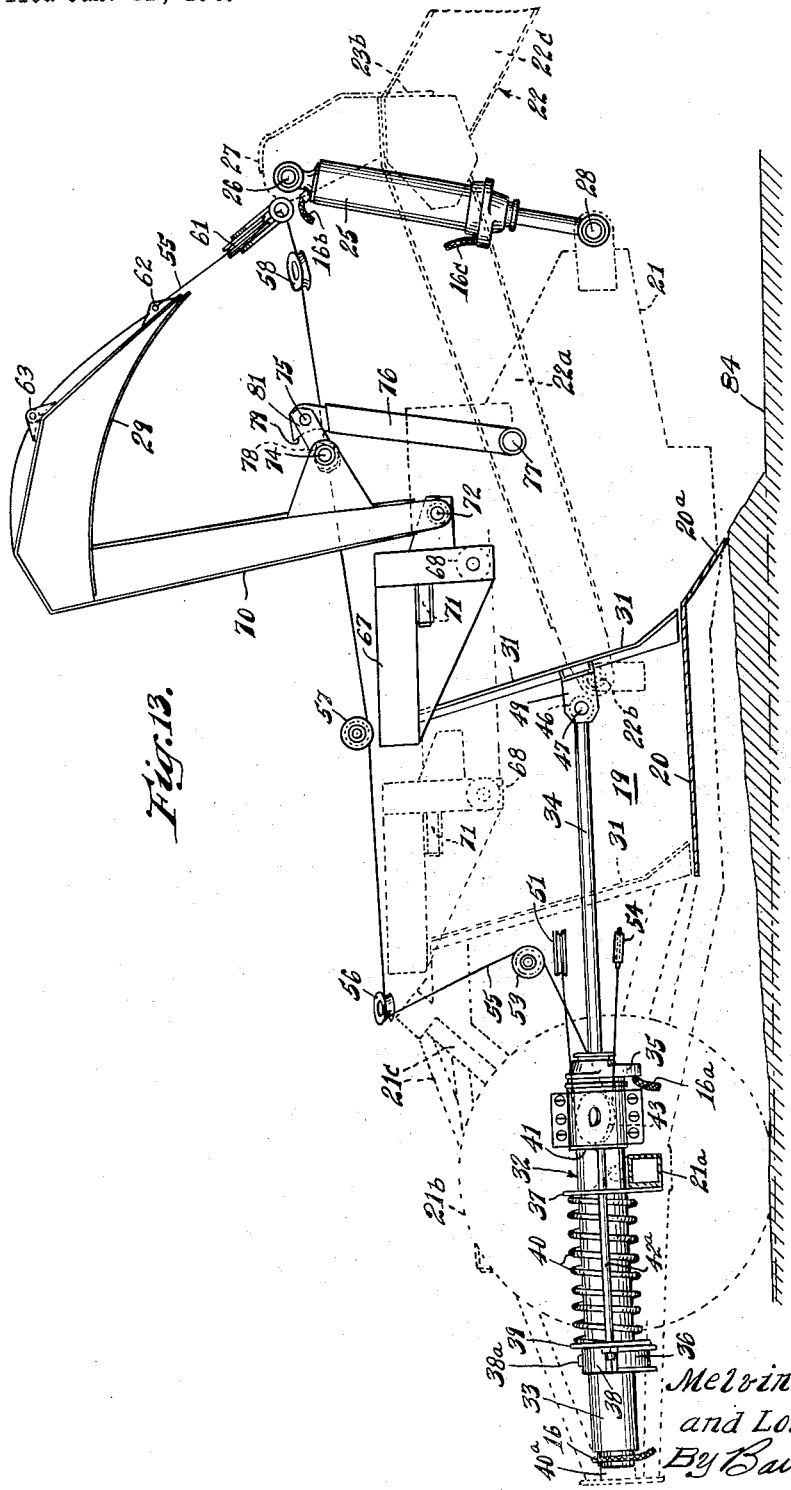

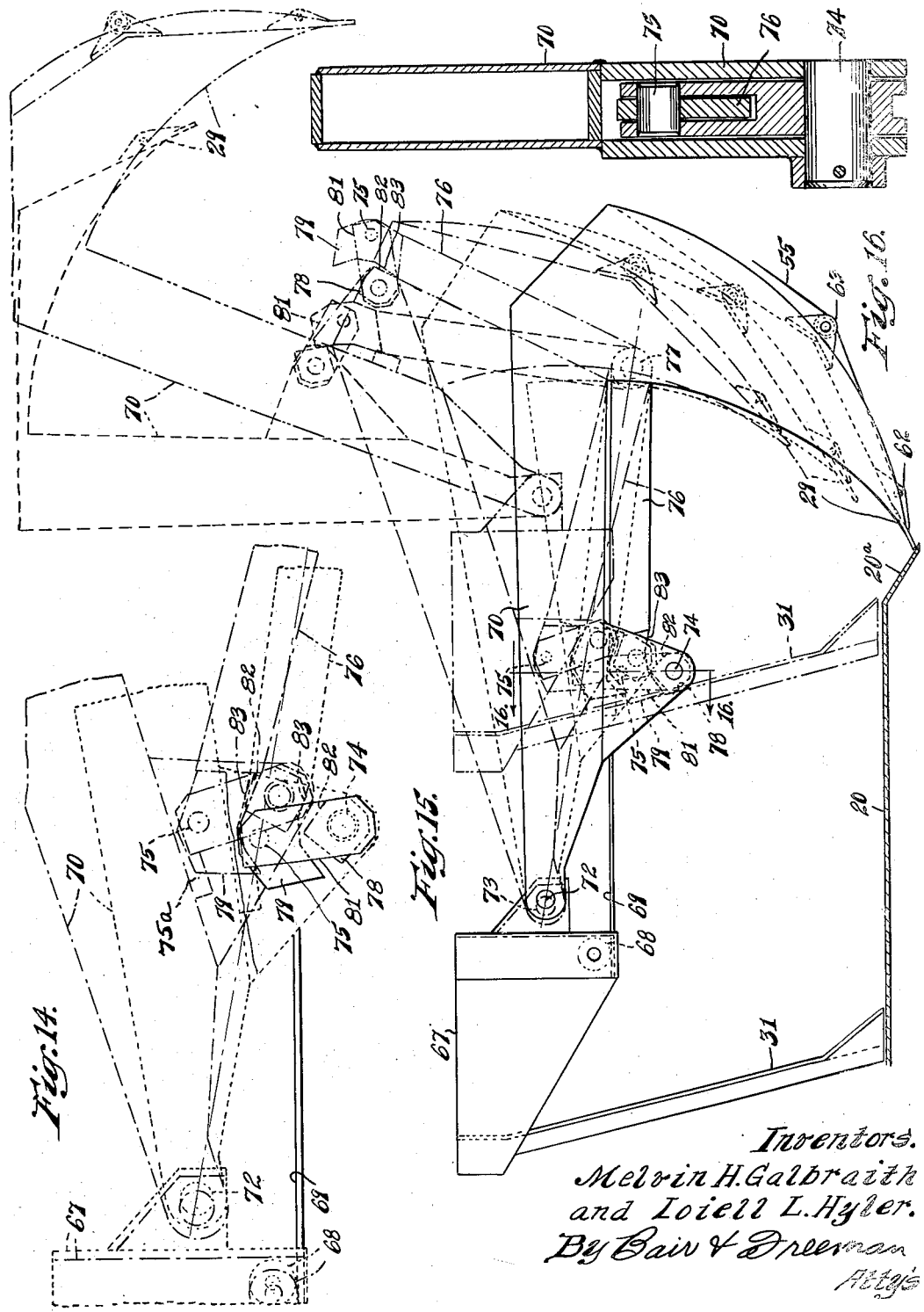

Patented Aug. 28, 1951

2,565,850

UNITED STATES PATENT OFFICE 2,565,850

APRON AND EJECTOR CONTROL FOR EARTH MOVING APPARATUS

Loiell L. Hyler and Melvin H. Galbraith, Cedar Rapids, Iowa, assignors to La Plant-Choate Manufacturing Co., Inc., Cedar Rapids, Iowa, a corporation of Delaware Application January 31, 1946, Serial No. 644,559

8 Claims. (Cl. 37—129)

This invention relates to apparatus for moving earth-like material and particularly to apparatus for excavating, transporting and depositing earth. While there are several fairly well defined types of machines for performing these operations, there appears to be a need for a device of this general sort that is more closely integrated with its propelling tractor. Especially in higher speed units, the trend is toward the use of pneumatic tired wheeled tractors driving on the two rear wheels and steering by means of the front two wheels. These tractors are largely designed for earth working tools effective to load the rear wheels so that the engine power is fully available as tractive effort. Yet the load on the front wheels is also taken into account so that it is effective to maintain steering traction. Furthermore, much earth moving apparatus is by preference of the cable-operated type but the available tractors are frequently factory-equipped with hydraulic actuators for associated equipment.

It is therefore an object of the invention to provide an earth moving apparatus to be drawn by a pneumatic tired, high-speed tractor and so designed and connected as to be effective to enhance the tractive effort and steering characteristics of the tractor.

Another object of the invention is to provide an interconnected earth mover and tractor in which the motions of the tractor do not interfere with the proper functioning of the earth mover.

Another object of the invention is to retain the advantages of the cable operated type of earth mover while also taking advantage of hydraulic actuating equipment on the associated tractor.

Another object of the invention is to provide an improved operating system for moving various parts of an earth mover to effect excavation, transportation, and ejection of earth.

It is a further object of the invention to provide a cable and sheave system combined with a hydraulic means, such as a double acting jack, for actuating an earth moving apparatus.

It is also an object of the invention to provide an improved actuating system for earth moving apparatus, which will effectively absorb shocks incident to the operations required of such apparatus.

It is also an object of the invention to provide an improved apron construction and sheave and cable mechanism therefor in earth moving apparatus.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

Fig. 1 is a side view of the forward part of an earth mover and tractor showing mainly the tractor for pulling the earth mover and a portion of the hitch or coupling between the tractor and the earth mover;

Fig. 2 is a sectional view of a portion of the coupling taken on line 2—2 of Fig. 1;

Fig. 3 is a sectional view of the coupling taken on line 3—3 of Fig. 1, with parts thereof broken away;

Fig. 5 is a side view of the earth mover in a raised position for transporting earth;

Fig. 6 is a top plan view of the earth scraper, a portion of the coupling being broken away;

Fig. 7 is a top plan view of the hydraulic jack and sheave structure;

Fig. 8 is a vertical sectional view of the hydraulic jack and part of the sheave structure, taken on the line 8—8 of Fig. 9;

Fig. 9 is a side elevation of the hydraulic jack and sheave structure, parts being in section on the line 9—9 of Fig. 8;

Fig. 10 is a diagrammatic view of the cable arrangement showing the manner in which the various parts are operated by the hydraulic jack;

Fig. 11 is a diagrammatic view of the apparatus in the carrying position and illustrates the relative position of the various parts such as the hydraulic jacks, cable, sheaves, bowl, apron and ejector;

Fig. 12 is a diagrammatic view of the parts shown in Fig. 11 in the loading or scraping position;

Fig. 13 is a diagrammatic view of the parts shown in Fig. 11 in the unloading position.

Figure 14 is an enlarged diagrammatic view of the compound linkage mechanism in various positions.

Figure 15 is an enlarged diagrammatic view of the compound linkage mechanism, apron and ejector in various positions; and Figure 16 is an enlarged view of the compound linkage pivots position, taken on line 16—16 of Figure 15.

Figure 4:
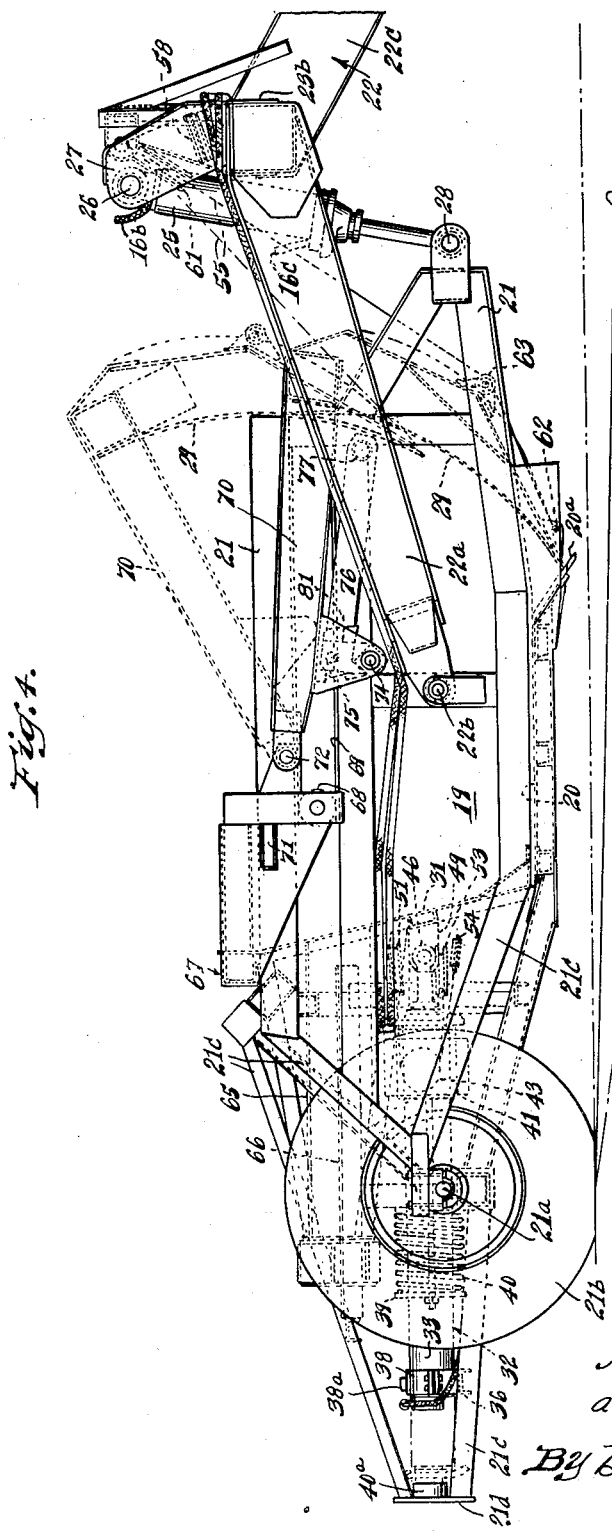
Fig. 4 is a side view of the earth mover in a low carry, or spreading position and including the portion of the coupling shown as broken off in Fig. 1.

The preferred form of the invention shown in the drawings is embodied in connection with a commercially available tractor 11 having a pair of front, pneumatically tired steering wheels 12 and a pair of rear, pneumatically tired driving wheels 13. The tractor 11 is provided with a hydraulic pump 14 driven by the tractor motor for applying pressure to a hydraulic fluid, such as oil. Pressure fluid from the pump or spent fluid returning to the pump directly or through the customary reservoir (not shown) are under the tractor operator's control. He is afforded two distinct hydraulic-power closed circuits, each of them being under his control for flow of pressure fluid in either side of the circuit. A pair of separately operable control levers 15 and 15a operate individual ones of a pair of control valves 17 and 17a, each being the functional equivalent of the usual hydraulic four-way valve. One pair of flexible conduits 16 and 16a provided with readily detachable couplings 18 conveys hydraulic fluid to and from the pump 14 under control of the valve 17 and of the lever 15, while another pair of forked flexible conduits 16b and 16c carries hydraulic fluid to and from the pump 14 under control of the valve 17a and of the lever 15a.

The hydraulic power mechanism, operator controlled, is for the actuation of an earth mover, generally indicated by numeral 19. The earth mover 19 is preferably arranged with a pair of side walls 21 incorporated with a bowl bottom 20 in a main bowl having a scraping edge 20a. The side walls 21 have the function of confining earth and also the function of constituting part of the framework of the earth mover. The side walls extend to a rear axle 21a (Fig. 6) having a pair of ground-engaging, pneumatically tired wheels 21b thereon. Additional braces 21c extend between the bowl bottom 20, the side walls 21, the axle 21a, and an impact plate 21d, and with these parts can be considered to constitute the bowl frame of the earth mover. These parts with their appurtenances can all pivot about the horizontal, rotational axis of the wheels 21b as a center.

To join the bowl frame to the tractor there is provided a yoke frame, generally designated 22. This includes a pair of side arms 22a at their rearward ends connected by pivot pins 22b to the side walls 21 and at their forward ends joined to a cross member 23b. Extending centrally from the cross member is a rigidly joined pedestal 22c also included in the yoke frame. By means of the pivot pins 22b, the bowl frame and the yoke frame are articulated for relative rotation about the horizontal axis of the pins. It can be considered that the bowl frame and the yoke frame together constitute the main frame of the earth mover and provide a main frame of an articulated type.

To produce relative motion between the bowl frame and the yoke frame there is provided a pair of hydraulic jacks 24 and 25. The jacks at their upper ends are connected by pins 26 to brackets 27 upstanding from the cross member 23b and at their lower ends are connected by pins 28 to the bowl walls 21 of the earth mover. The hydraulic jacks 24 and 25 are double-acting and are included by the forked conduits 16b and 16c in the hydraulic circuit under control of the lever 15a. When the lever is appropriately moved, the jacks 24 and 25 act hydraulically in parallel and serve to raise and lower the scraping edge 20a to position the earth mover in the earth scraping position, or in the earth unloading position, or in the earth transporting position, as described in greater detail hereinafter.

The specific form of coupling joining the earth mover to the tractor includes a clevis 23c on the end of the pedestal 22c. A removable pivot pin 23 permits the connection of any sort of hitch, even one including a dolly having a pair of ground-engaging wheels, to the earth mover. Preferably, however, the pin 23 serves as a connection for rotation about a vertical axis between the earth mover and the tractor. It engages an A-frame 23d pivotally supported to rotate about a longitudinal axis upon a pin 23e spanning the closed portion of the A-frame and piercing the beam of a clevis yoke 23a. A pair of bolts 23f connect the clevis yoke to pairs of straddling ears 23g on the tractor and afford relative motion about a transverse axis. The bolts 23f, the pin 23e, and the pin 23 are all straddle mounted and the axes of the pin 23e and of the bolts 23f pass as close as practically possible to the rotational axis of the rear wheels 13. Thus, while the earth mover and the tractor have freedom for limited relative rotation about three mutually perpendicular axes, a part of the weight of the earth mover is transferred to the tractor for maintenance or enhancement of tractive adhesion. Yet, the weight transfer and tractive forces are so directed that no or only small rotating couples are imposed upon the tractor. The earth mover is in this fashion integrated with the tractor for satisfactory joint performance.

To assist in handling the earth, the earth mover includes a front apron 29, or secondary bowl, movable between a lower position adjacent the scraping edge 20a, wherein it closes the otherwise open forward end of the main bowl, and an upper position away from the scraping edge wherein it leaves the main bowl open at the forward end. There is also included an earth ejector 31 mounted to move between a rearward position wherein it constitutes a wall closing the otherwise open rearward end of the main bowl and a forward position adjacent to scraping edge 20a, this motion being like that of a plunger. Generally speaking, it is desirable to raise the apron 29 only sufficiently or to a limited extent during the scraping and loading operation to provide a satisfactory ingress opening for the earth, but of course, at this time the ejector should be in its fully retracted position. After the scraper bowl is filled, however, the apron 29 should be lowered and the main frame raised to transport the earth to another location for unloading. During the unloading operation the apron 29 should be raised to its uppermost position to permit the ejection of all the earth from the scraper bowl. Under all conditions, close control of the movement of the apron, bowl frame and ejector are desirable, and in accordance with our invention such control is afforded.

Referring particularly to Figs. 6 to 10, inclusive, there is illustrated a hydraulic jack generally indicated 32 to operate the apron 29 and the ejector 31. The hydraulic jack 32 comprises a cylinder 33 within which is disposed a piston 33a connected to a protruding piston rod 34. The piston is exposed on both sides to hydraulic fluid and is operated by hydraulic pressure in the usual manner. Hydraulic fluid is supplied under pressure to the cylinder 33 on one side of the piston 33a or is released therefrom by the conduit 16, and is supplied under pressure to the cylinder on the other side of the piston, or is released therefrom, through a port 35 joined to the conduit 16a. By properly manipulating the lever 15 and the valve 17, the operator can control relative expanding and contracting motions of the cylinder and piston rod impelled by hydraulic force. The jack 32 is consequently double-acting and is one form of a controllable, two-element expansible member.

The jack cylinder 33 is mounted on the axle 21a and on an angular cross support 36 rigidly attached to the bowl frame of the earth mover. The cylinder is permitted to slide axially, so that both it and the piston move relative to the frame, by passing through a freely fitted plate 37 upstanding from the axle 21a and through a strap 38 together with a concave portion of the cross support forming a freely fitting sleeve. A guide pin 38a seated in the strap 38 engages a longitudinal slot 38b in the cylinder 33 to preclude rotation thereof. A heavy spring 40 is disposed between the plate 37 and a plate 39 and encompasses the cylinder 33. Tie rods 42a are positioned in the rear plate 39 by suitable nuts, pass freely through the forward plate 37 and are attached to sheave housings 41 clamped around the forward end of the jack cylinder 33. The rear plate 39, being mounted on the jack cylinder, moves therewith to compress or afford expansion of the spring 40, depending on the position of the jack cylinder 33 relative to the axle 21a or bowl frame. A stop 40a on the impact plate 21d prevents the cylinder 33 from moving rearwardly more than a predetermined distance.

Two sheave wheels 42 and 43 are rotatably mounted within the sheave housings 41 on the movable jack cylinder 33. The jack piston rod 34 is provided with an eye 46 which engages a pin 47. The pin 47 also extends through a member 49 rigidly attached to the ejector 31.

An upper horizontally disposed sheave 51 is rotatably mounted on the forward one of a pair of triangular cross members 52 of the bowl frame, and a second vertical sheave 53 is mounted on the bowl frame slightly to one side of and above the sheave 51. A dead end connection 54 is mounted on the opposite side of the triangular cross member 52. As best shown in Fig. 10, a cable 55 is dead-ended on the connection 54, passes over the sheaves 43, 51 and 42 and finally is led over the sheave 53 to the side of the bowl frame. The cable 55 is then led forwardly (Fig. 6) through a suitable sheave 56 on the bowl frame, a sheave 57 on the yoke frame, and a sheave 58 on the cross member 23b. It passes then through a sheave 61 pivoted to swing on a transverse axis on the stationary cross member of the yoke frame, and then to a coupling 62 at the central bottom of the apron 29. If desired, the apron can be provided with a guide roller 63.

As shown in Figs. 8 and 9, rollers 64, preferably three in number, are provided on a rearwardly extending channel stem 65 on the ejector 31. These rollers engage the three faces of a longitudinal, triangular beam 66 supported on the triangular cross members 52. As the ejector is moved forwardly or rearwardly, the rollers 64, moving easily along the beam 66, guide the ejector.

Referring now to Figs. 4, 5 and 6, the ejector 31 is provided with integral side carriages 67. Each carriage has a vertical roller 68 thereon rolling along in a horizontal channel 69 defined by the two uppermost reinforcing shapes on the side wall 21 of the bowl frame. The carriages 67 are also provided with horizontal rollers 71 which engage the side walls 21 of the bowl to guide the ejector. The apron 29 has a pair of integral arms 70 that are pivoted to the carriages 67 by pivot pins 72. Each of the rearwardly extending arms 70 of the apron 29 has a downward projection (Fig. 5) carrying a main pivot pin 74. On this pin is journalled a stub link 81 itself carrying a pivot pin 75. A hook link 76 engages the pin 75 and also a pivot pin 77 on the bowl side wall 21. Relative motion about the pivot pin 75 between the hook link 76 and the stub link 81 is sometimes desired. The stub link arrangement takes the place of a slotted connection or other means of avoiding substantial ejector motion during initial opening movement of the apron. But in other circumstances unrestricted relative motion between the hook link and the stub link is not desired. Therefore a suitable stop for the stub link is mounted on the apron arm and the hook link is formed to provide a cam face 79 (Fig. 13) adapted in some positions of the link 76 to abut a similar face 78 on the stub link 81. When such abutments occur, the link 81 is in effect either part of the apron arm or part of the hook link 76.

The apron arms 70 between the pivots 72 and 74 and the linkage (the links 76 and 81 considered substantially as a unit) between the pivots 77 and 74 provide a toggle so constructed that the forward movement of the ejector 31 is substantially prevented until the apron 29 has been raised a predetermined distance upwardly. The apron 29 rotates about the pivot 72 and, as will be clear from the drawings, both the pivots 74 and 75 are below an imaginary line drawn to intersect the two pivots 72 and 77. Therefore, even if a force is applied tending to push the ejector 31 forwardly, the ejector is not permitted to move substantially as long as the pivot point 74 is below or on the line drawn to intersect the two pivot points 72 and 77.

When the pivot 74 is lifted above the imaginary line by rising motion of the apron, the toggle is moved out of and past resisting position. Then a forwardly urging force on the ejector 31 is effective not only to advance the ejector but also further to collapse the toggle and add to or supersede the force tending to raise the apron. The linkage is such that the apron is approximately balanced in fully open position (Fig. 13) when the ejector is fully forward. The cable connections and the tension in the cable 55 are such that in the early opening part of the apron motion, the cable lifts the apron and "breaks" the toggle, pressure upon the ejector being ineffective. In the later opening part of the apron motion, the pressure upon the ejector is effective through the toggle linkage to complete the operation with some help from or at least without hindrance by the cable 55. The reverse sequence occurs during return motion.

Referring specifically to Figures 14, 15 and 16, it is noted that when the apron 29 is in the lowermost or carrying position as shown in full lines in Figure 15, that a shoulder 82 on the block 78 is spaced from a surface 83 on the hook 79. As the apron is raised a limited distance, the block 78 remains stationary with relation to the apron. The apron 29 may be lifted to the loading position, as shown in dotted lines in Figures 14 and 15, but obviously the ejector 31 cannot move forwardly. As the apron 29 is raised further, as shown by the "one dot and dash" lines in Figures 14 and 15, the shoulder 82 engages the surface 83 and begins to separate short link 81 from stop 75a on apron 29. The apron 29 and arm 70 thereafter rotate about the lower pivot point 74 and when the pivot point rises above dead center the ejector is allowed to move forward due to constant force applied to it and resulting in raising the apron to a higher position, as shown by the "two dot and dash" lines in Figure 15, and finally to the fully raised position shown in the "dash" lines in Figure 15. The effect of the two pivots 74 and 75 is similar to two gear segments rolling over each other, but this construction makes it possible to tie the parts together by a permanent linkage. The apron 29 obviously returns to the lowermost or carrying position as the arm 70 and members 76 rotate about the pivots 74 and 75 in the reverse sequence from when the apron is raised.

Operation

Referring particularly now to Figs. 11, 12 and 13, Fig. 11 shows the main parts of the scraper in the carrying position, that is, the position wherein the scraper bowl has been loaded with material and has been raised so that the scraper readily can be moved to another location. The hydraulic jacks 24 and 25 have raised the bowl frame to its highest position and the scraping edge 20a is well above the level of the earth 84. The apron 29 is in its lowermost position and hydraulic fluid under pressure is not being applied to either end of the hydraulic jack 32 by the pump 14. Rather, the valve 17 is in a position so that both ends of the cylinder are hydraulically closed. Under these conditions, the piston rod 34 is retracted in the cylinder 33, the cylinder 33 is in its extreme forward position, the spring 40 is compressed and the movable sheaves 42 and 43 are in their closest position with respect to the dead-end connection 54 and the stationary sheave 51. The maximum amount of cable 55 is, therefore, paid out and is kept taut as the apron is pulled by gravity to its lowermost position.

Referring now to Fig. 12, the scraper is shown in the loading position. In this position, the jacks 24 and 25 have lowered the bowl to a position such that the scraping edge 20a cuts into or scrapes up the earth 84 or other material as the machine is advanced by the tractor, thus filling the bowl. Hydraulic pressure is applied to the rearward portion of the hydraulic jack 32. But the toggle mechanism prevents material forward movement of the ejector 31 and of the piston rod 34. There is, however, a motion of the cylinder 33 rearwardly, somewhat assisted by the spring 40, although the force applied by the spring is not particularly important. The jack cylinder continues to move rearwardly as long as pressure is applied until it is arrested by the stop 40a. The rearward movement of the jack cylinder 33 moves the sheaves 42 and 43 rearwardly and thus takes up cable 55, so that the apron 29 is raised a sufficient distance to provide an adequate opening for loading. With the illustrated linkage, it is not necessary to move the cylinder the full distance to the stop 40a to raise the apron sufficiently to effect loading. After the scraper bowl is loaded, the hydraulic system is operated to return the parts to the position shown in Fig. 11 and the material loaded is transported to another location.

When the scraper arrives at the new location, it is often desirable not only to unload but also evenly to spread the material from the apron and the bowl. This is accomplished when the parts are positioned as shown in Fig. 13. The hydraulic bowl jacks 24 and 25 lower the bowl frame so that the edge 20a is held slightly above the level of the ground 84. The main jack 32 is operated so that first the cylinder 33 moves rearwardly, thus again raising the apron 29 to discharge it in the same manner as described with respect to Fig. 12. However, when the cylinder 33 has moved to the stop 40a, the arms 70 of the apron have been thereby rotated a sufficient distance so that the pivot 74 is raised above dead center. When this occurs, and since hydraulic power is still supplied to the jack 32, the piston rod 34 moves forwardly and forces the ejector 31 forwardly on rollers 64 and 68 to push the material in the main bowl out of the open front end thereof and at the same time spread it, since the tractor is still moving. As the ejector 31 moves forwardly, it rotates the apron 29 and its arms 70 about the pivots 72 until the apron 29 completely clears the open front of the main bowl and assumes the position shown in Fig. 13.

After all the material is ejected from the main bowl, the hydraulic system is actuated to retract the piston rod 34, thus initiating downward movement of the apron 29. The force of gravity thereafter is effective to assist this movement of the apron downwardly and through the toggle linkage to urge the ejector rearwardly. While if the apron has sufficient mass it can do this work unassisted, in the usual case, the mass of the apron is insufficient acting alone. The strength of the spring 40 and the frictional resistance of the parts are such that the retraction of the piston rod 34 is continued with hydraulic assistance until the ejector 31 is in its rearmost position. The apron 29, therefore, lowers until the piston rod 34 is fully retracted. The cylinder 33 moves forwardly, compressing the spring 40 as the cable 55 runs through the sheaves as they approach each other during the lowering movement of the apron 29. Thereafter the jacks 24 and 25 are operated to restore them to the carrying position.

In order to illustrate the function of spring 40, let us assume that the spring is removed from the mechanism and we perform a complete dumping operation cycle. In Figure 11 the bowl is in the raised or transporting position, in which position it may remain during the dumping cycle. The apron is closed due to the force of gravity acting on it and the earth material contained therein. The closed position is permitted by the contracted position of jack 32 which has allowed paying out of cable 55 connected to apron 29. As hydraulic fluid is directed to the base end of jack 32 through connection 16, it forces an extending of the jack. Since motion of piston rod 34 is greatly resisted by the position of the compound apron linkage, reaction takes place in movement of cylinder 33 sliding in mount 36 in Figure 12. This motion reacts through the sheave arrangement to lift the apron at point 62. Movement of cylinder 33 continues until it strikes stop 40a of the main bowl rear structure.

At this time the apron has been raised sufficiently to substantially break the toggle action of the apron compound linkage thereby removing the above-mentioned resistance to movement of piston rod 34. There still remains resistance, however, due to the weight of the apron and material being ejected by ejector 31. As the piston rod 34 approaches the end of its travel, as shown in Figure 13, the resistance gradually decreases. Actually a condition exists at the end of this travel in which resistance consists solely of friction of the various moving parts. When this motion stops the whole mechanical system becomes static. During this operation the absence of spring 40 has had no effect on the operation.

However, as the control lever is positioned for directing hydraulic fluid to the rod end of jack 32 through connection 16a, the motion of the piston rod 34 and cylinder 33 are resisted by friction of the apron-ejector system on the one hand and sliding friction of cylinder 33 in its mounting 36 on the other hand. This then represents a differential condition in which motion of one or the other of parts 34 and 33 will take place and determined by which has the least frictional resistance.

It has been found that with this particular design that the greater resistance is encountered in the apron-ejector system. This is due to the fact that, first, the apron is in a position that its weight is no longer effective to return by gravity; second, that there is a much greater mass involved; and, third, that there is usually unexpelled earth material clinging to the sides and bottom of the bowl. With the above in mind, it becomes quite apparent that the first movement of this differential couple will be cylinder 33 returning to its original position, as shown in Figure 11. At this position it would be necessary to provide a stop not required if the spring were in place. Now with continued introduction of fluid into the jack, piston rod 34 begins to retract into the jack and return the apron-ejector system towards their original position. However, as soon as frictional resistance of the ejector is equalled, then surpassed by the force resulting from a shifting of the apron center of gravity, there will be a sudden uncontrolled shifting of the whole mechanical system including cylinder 33 of jack 32, until the base of jack 32 strikes stop 49a of the main bowl rear structure. This would be undesirable and would introduce heavy shock loads to the mechanical structures involved and introduce momentary high pressures in the hydraulic system.

The purpose of the spring 40 is to avoid the need of a shock absorber by preventing the action just described from occurring. This is accomplished by locating the spring in a position and with sufficient force in the proper direction to substantially react against the above mentioned three causes of frictional resistance in the apron-ejector system, or in other words, to provide a resistance to movement of cylinder 33 greater than the resistance to movement of the apron-ejector system.

Some changes may be made in the arrangement and construction of the various parts of our earth moving apparatus without departing from the real spirit and purpose of our invention, and it is our intention to cover by our claims any modified forms of structure or use of mechanical equivalents, which may be reasonably included within their scope.

We claim as our invention:

1. Apparatus for moving earth-like material comprising a frame, a bowl for obtaining said material supported by said frame, said bowl having an open front, a movable apron for opening and closing the front of said bowl, an ejector disposed within said bowl, said apron and said ejector being supported by said frame, common hydraulically actuated means also supported by said frame for actuating both the apron and the ejector, said hydraulically actuated means comprising a cylinder and piston therein operated by the application of hydraulic fluid under pressure, said cylinder and piston being movable relative to each other and to said frame, means for utilizing the movement of said cylinder to raise and lower said apron through a limited distance to permit loading of said bowl and to close the front thereof for the transportation of the material so loaded, and means for utilizing the movement of said piston for actuating said ejector and also for raising said apron through a greater distance to completely open the front of said bowl, so that said ejector removes all the material therefrom.

2. Apparatus for moving earth-like material comprising a frame, a bowl for containing said material supported by said frame, said bowl having an open front, a movable apron for closing and opening the front of the bowl, an ejector disposed within the bowl, said apron and said ejector being supported by said frame, hydraulic means also supported by said frame and comprising a jack cylinder and a piston movable relative to each other and to said frame, means for utilizing the movement of said cylinder to move said apron through a limited distance, means for utilizing the movement of said piston for actuating said ejector and also for moving said apron through a greater distance, means for preventing movement of said ejector, and means responsive to movement of said apron within said limited distance for releasing said preventing means.

3. An earth mover comprising a bowl frame including an open-ended bowl; an apron movable to close one end of said bowl; an ejector movable through said bowl; said apron and ejector being supported by said frame; a piston rod on said ejector; a piston on said rod; a cylinder receiving said piston and said rod; means for supplying hydraulic pressure fluid to said cylinder selectively on opposite sides of said piston; means mounting said cylinder for sliding movement in said frame, an abutment on said frame for limiting the sliding movement of said cylinder; and a cable reeved between said frame, said cylinder, and said apron for imparting sliding movement of said cylinder to said apron.

4. Apparatus for moving earth-like material comprising a frame, a bowl for containing said material supported by said frame, said bowl having an open front, a movable apron for opening and closing the front of said bowl, an ejector disposed within said bowl, double acting means supported by said frame for actuating both the apron and the ejector, said double acting means comprising two parts movable in similar directions relative to each other and to said frame, means for utilizing the movement of one of said parts to raise and lower said apron through a limited distance to permit loading of said bowl and to close the front thereof for transporting said material, means associated with said apron and said ejector for utilizing the movement of the other part for actuating said ejector and also for raising said apron through a greater distance to completely open the front of said bowl so that the ejector removes all material therefrom, and stop means for preventing appreciable movement of said ejector until said apron has been raised a predetermined distance.

5. Apparatus for moving earth-like material comprising a frame, a bowl for containing said material supported by said frame, said bowl having an open front, a movable apron for opening and closing the front of said bowl, an ejector disposed within said bowl, double acting means supported by said frame for actuating both the apron and the ejector, said double acting means comprising two parts movable relative to each other and to said frame, means for utilizing the movement of one of said parts to raise and lower said apron through a limited distance to permit loading of said bowl and to close the front thereof for transporting said material, means for utilizing the movement of the other part for actuating said ejector and also for raising said apron through a greater distance to completely open the front of said bowl so that the ejector removes all material therefrom, and stop means for preventing appreciable movement of said ejector until said apron has been raised a predetermined distance, said first part being adapted to raise said apron said predetermined distance to release said last mentioned means.

6. Apparatus for moving earth-like material comprising a main frame, a bowl for containing said material supported by said frame, said bowl having an open front, a movable apron for closing and opening the front of the bowl, an ejector disposed with the bowl, hydraulic means for actuating both the apron and the ejector, said hydraulic means comprising a jack cylinder and a piston therein operated by the application of hydraulic fluid under pressure, said cylinder being movable relative to said piston and vice versa, means for utilizing the movement of said cylinder to raise and lower said apron through a limited distance to permit loading of said bowl and to close the front thereof, means for utilizing the movement of said piston for actuating said ejector and also for raising said apron through a greater distance to completely open the front of said bowl so said ejector may remove all the material therefrom, and a means operated by said apron for preventing movement of said ejector until said apron has been raised a predetermined distance, said jack cylinder being adapted to raise said apron said predetermined distance to operate said last means.

7. Apparatus for moving earth-like material comprising a bowl for containing solid material, said bowl having an open front, a movable apron for opening and closing the front of the bowl, an ejector movable within said bowl to eject material from the front thereof, hydraulic means for urging the ejector to move in an ejecting direction, means connecting said ejector to said bowl adjustable to positions for preventing and for permitting ejecting movement of said ejector, means connecting said apron to said adjustable means, and a cable and sheave arrangement operated by said hydraulic means to open said apron and move said adjustable means from movement-preventing to movement-permitting position.

8. Apparatus for moving earth-like material comprising a bowl for containing solid material, said bowl having an open front, a movable apron for opening and closing the front of the bowl, an ejector movable within said bowl to eject material from the front thereof, double-acting hydraulic means effective in one direction for urging the ejector to move in an ejecting direction, means connecting said ejector to said bowl adjustable to positions for preventing or for permitting movement of said ejector in an ejecting direction, means connecting said apron to said adjustable means, and a cable and sheave arrangement operated by said double-acting hydraulic means to open said apron and move said adjustable means from movement-preventing to movement-permitting position, said hydraulic means being effective in the other direction for initiating closure of said apron.

LOIELL L. HYLER.
MELVIN H. GALBRAITH.

REFERENCES CITED

The following references are of record in the file of this patent:

UNITED STATES PATENTS

| Number | Name | Date |
|---|---|---|
| 216,465 | Snowden | June 10, 1879 |
| 2,048,952 | Ross | July 28, 1936 |
| 2,095,759 | Maloon | Oct. 12, 1937 |
| 2,164,461 | Le Bleu | July 4, 1939 |
| 2,253,808 | Petrucci | Aug. 26, 1941 |
| 2,284,412 | Frentzel, Jr., et al. | May 26, 1942 |
| 2,330,113 | Daniels | Sept. 21, 1943 |
| 2,332,686 | Austin et al. | Oct. 26, 1943 |
| 2,406,826 | French et al. | Sept. 3, 1946 |
| 2,411,688 | Keim et al. | Nov. 26, 1946 |
| 2,447,455 | Allin | Aug. 17, 1948 |